United States Patent [19]

Neubauer

[11] Patent Number: 5,076,521

[45] Date of Patent: Dec. 31, 1991

[54] LOAD PLATFORM FOR TELESCOPIC HOIST

[75] Inventor: Willibald Neubauer, Seattle

[73] Assignee: Genie Industries, Inc., Redmond, Wash.

[21] Appl. No.: 483,446

[22] Filed: Feb. 21, 1990

[51] Int. Cl.[5] .......... F16M 11/16

[52] U.S. Cl. .......... 248/188; 248/219.2; 91/168

[58] Field of Search .......... 248/219.2, 188, 188.5, 248/188.8, 357, 405, 432, 161, 27.1; 91/168, 401, 422

[56] References Cited

U.S. PATENT DOCUMENTS

| | | | |
|---|---|---|---|
| 2,915,270 | 12/1959 | Gladsen et al. | 248/219.2 X |
| 3,198,466 | 8/1965 | Gardner et al. | 248/219.2 X |
| 3,406,939 | 10/1968 | Doerner | 248/405 |
| 3,552,267 | 1/1971 | Bushnell et al. | 91/168 |
| 4,074,941 | 2/1978 | Jablonski | 248/219.2 X |
| 4,265,421 | 5/1981 | Buchmayer | 248/188 |
| 4,456,212 | 6/1984 | Raftery | 248/219.2 X |
| 4,546,944 | 10/1985 | Cea | 248/219.2 |
| 4,626,974 | 12/1986 | Dean | 248/219.2 X |
| 4,701,577 | 10/1987 | Bourrieres | 248/219.2 X |
| 4,807,838 | 2/1989 | Anderson | 248/188 X |

*Primary Examiner*—Rodney M. Lindsey
*Assistant Examiner*—Suzanne L. Dino
*Attorney, Agent, or Firm*—Seed and Berry

[57] ABSTRACT

A telescopic mast has a top mounting assembly which plugs into the top cylinder of the mast and presents an upwardly projecting threaded stud. A platform unit is seated on the mounting assembly and includes a wing nut which is screwed onto the stud and can be turned independently of the rest of the platform unit. The nut is exposed in a recess at the top of the platform unit for access to permit manual turning.

7 Claims, 1 Drawing Sheet

FIG. 1
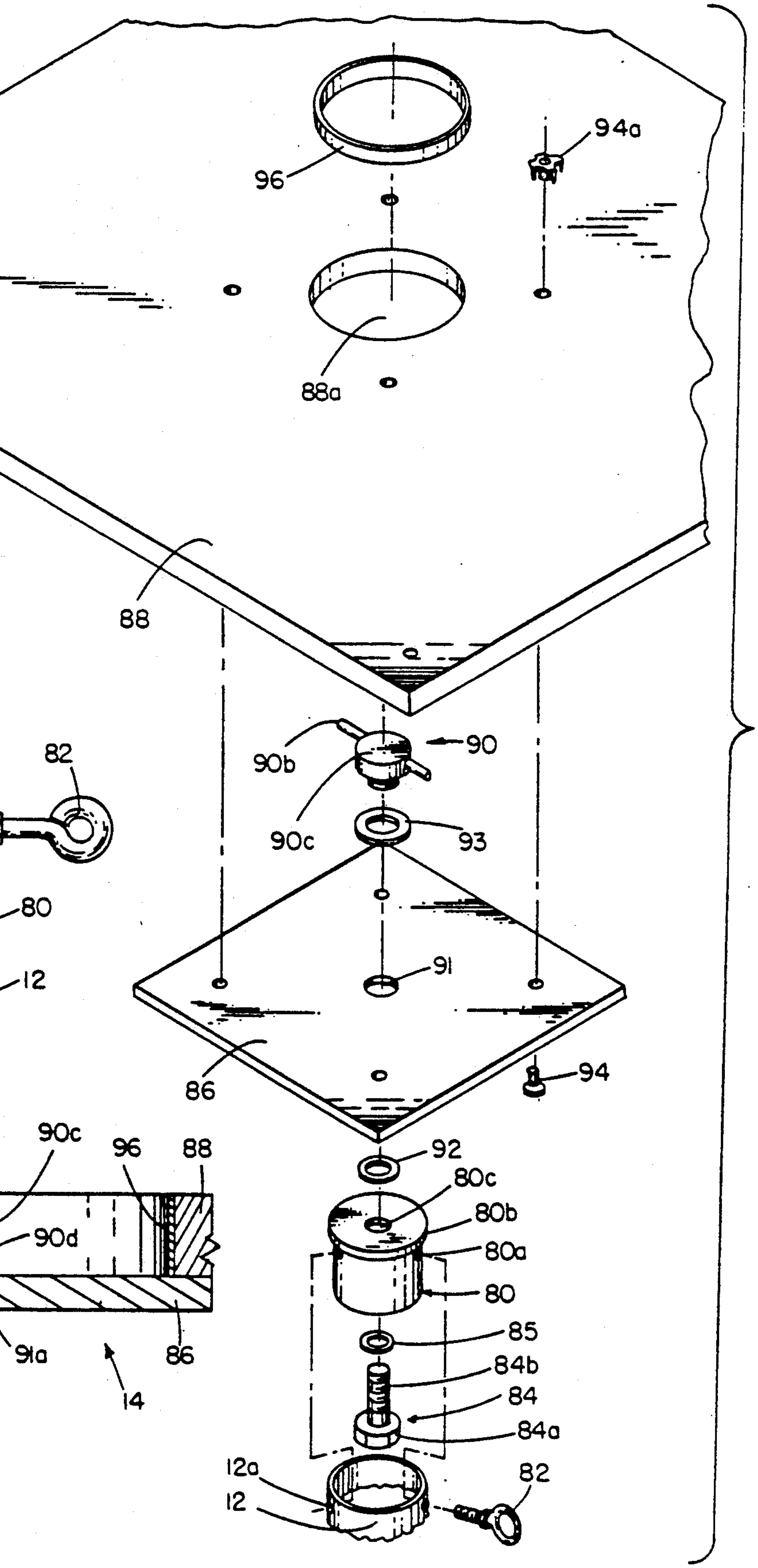
FIG. 3
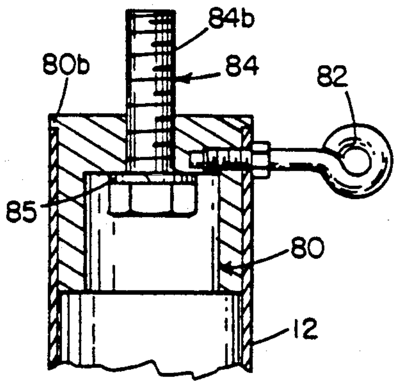
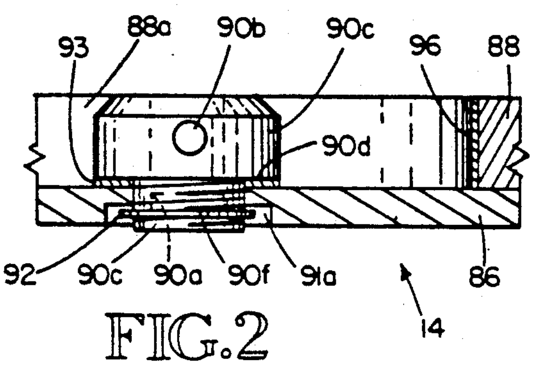
FIG. 2

LOAD PLATFORM FOR TELESCOPIC HOIST

TECHNICAL FIELD

The present invention relates to load platforms for telescopic hoists of the type shown, for example, in U.S. Pat. No. 3,552,267, wherein a single telescopic mast is supported on caster-mounted outriggers and carries a platform for supporting loads, such as ceiling boards, ducts, insulation, etc., at a convenient working height.

BACKGROUND OF THE INVENTION

Hoists of such type have been modified from time to time with respect to the platform mounting arrangement. For example, a head casting is in use providing four elongated horizontal sockets to receive removable support rods at the four quadrants. These rods extend through sleeves mounted on the underside of a flat platform comprising a piece of plywood, for example, and are held in place by setscrews passing through the head casting. When such a hoist is to be stored, the setscrews are loosened and the rods removed from the sockets and sleeves. There are then four rods and the platform to be stored and accounted for.

SUMMARY OF THE INVENTION

The present invention provides an improved load platform which can be installed, removed, and stored as a unit. This is accomplished by providing a threaded stud as an upward projection from the top of the mast and screw mounting a platform unit on the stud by way of a special wing nut which is retained with the platform unit and is free to turn independently thereof.

In the preferred embodiment, the platform unit has a metal mounting plate and a plywood platform bolted together. The head of the wing nut occupies an enlarged central opening in the plywood platform and has a bottom shoulder bearing against the top of the mounting plate. From this bottom shoulder the nut has an extension passing through the mounting plate and interfitting with a retainer ring which is housed in a bottom counterbore in the mounting plate. The central opening in the plywood sheet is large enough to permit manual access to the wings for turning the wing nut without a need to use a wrench or other tool.

BRIEF DESCRIPTION OF THE DRAWINGS

FIG. 1 is an exploded view of a platform unit and related mounting structure in accordance with the present invention;

FIG. 2 is a fragmentary vertical sectional view through a central portion of the platform assembly; and FIG. 3 is a vertical sectional through the upper end of the hoist cylinder.

DETAILED DESCRIPTION OF THE INVENTION

Referring to the drawings, a typical hoist to which the present invention is applicable has a base assembly with outriggers and a telescopic mast having a bottom stationary cylinder, several intermediate telescopic cylinders, and a top cylinder with an open top. An example of such a hoist is disclosed in U.S. Pat. No. 3,552,267.

In accordance with the present invention, a platform assembly 14 is mounted as a unit on the upper end of the top cylinder 12 of a telescopic mast by way of a crown member 80 which plugs into the cylinder 12 and is locked in position by eyebolts 82 which screw into registering radial threaded holes 12*a*, 80*a* in the crown member and cylinder. The crown member 80 has a top overhanging lip 80*b* seated on the top of the cylinder 12 and has a center threaded bore 80*c* through which a bolt 84 extends from an underlying head 84*a* to project upwardly as a threaded mounting stud 84*b*. A lock washer 85 is mounted on the bolt 84 between its head 84*a* and the underside of the crown member 80.

The platform assembly 14 includes a mounting plate 86, a load platform 88, and a special wing nut 90 with retaining means thereon so that the platform assembly can be installed and removed as a unit. The wing nut 90 has an axial threaded bore 90*a* mating with the mounting stud 84, and has a pair of radial wings 90*b* on its head 90*c* . At the bottom of the head 90*c*, the wing nut is necked at a shoulder 90*d* and provides an extension 90*e* passing through a center hole 91 and bottom counterbore 91*a* in the mounting plate 86. The mounting plate can comprise a square sheet of aluminum or steel. The nut extension 90*e* has a circumferential groove 90*f* to receive retaining means comprising a split retainer ring 92 occupying the counterbore 91*a*. For ease of turning of the wing nut 90 relative to the mounting plate 86, preferably a washer 93 is provided between the nut shoulder 90*d* and the top face of the mounting plate 86 as part of the platform assembly 14.

The load platform 88 may consist of a square sheet of plywood secured on top of the mounting plate by bolts 94 which pass upwardly through registering holes in the mounting plate and plywood sheet and receive T-nuts 94*a* partially embedded in the plywood. The load platform 88 has a relatively large center access opening 88*a* which may be provided with a liner 96. The head and wings of the wing nut 90 occupy the access opening 88*a*, and the size of the opening is made sufficient for easy manual access to the wings 90*b* to turn the wing nut.

When the hoist is to be stored or moved to another work site, the platform assembly 14 can be removed merely by unscrewing the wing nut 90 from the stud 84. This can be accomplished without turning the mounting plate 86 and load platform 88 in view of the fact that the wing nut is free to turn independently. The eyebolts 82 not only secure the crown member 80 to the top cylinder 12*c*, they also provide by their eyes convenient anchoring elements for hold-down cords passing over a load on the platform 88. It will be appreciated that cradle members or other load supporting adapters may be mounted on the load platform 88 or substituted therefor.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. A platform assembly for a hoist of the type having a telescopic mast with a threaded stud projecting upwardly therefrom, said assembly comprising:
   - a nut with an enlarged head adapted to be screwed onto a said stud;
   - a platform unit turnably mounted on said nut; and
   - retaining means on the nut spaced below said head, said retaining means and head preventing the nut from separating from said platform unit and permitting the nut and the platform unit to be turned relative to one another.

2. A platform assembly according to claim 1 in which said platform unit comprises a mounting plate surmounted by a larger platform sheet; and in which said platform sheet has a center opening therethrough completely housing the head of said nut.

3. A platform assembly according to claim 2 in which said nut is a wing nut and said center opening gives finger access to the wings on said nut for manually turning the nut.

4. A platform assembly according to claim 1 in which said nut has a downward extension below said head of reduced diameter on which said platform unit is turnably mounted, said retaining means comprising a restraining ring mounted on said extension at the underside of said platform unit.

5. A platform assembly according to claim 1 in which said platform unit has a mounting plate and top platform element mounted on said mounting plate and extending outwardly therebeyond, said platform element having a central recess occupied by the head of said nut and giving access thereto for turning the nut, said retaining means comprising a retaining ring on said nut in a recess around the nut at the underside of said mounting plate.

6. A detachable platform unit for fitting onto an upwardly projecting threaded stud at the top of a mast, said unit comprising:

a bottom support plate and a larger top platform sheet providing a central through bore with a bottom counterbore in the support plate and a larger top counterbore through the platform;

fasteners connecting the support plate and platform sheet together, an internally threaded wing nut having a winged body within said top counterbore seated against said support plate and having a neck extending downwardly from said winged body into said bottom counterbore;

and an internal retaining ring mounted on said neck in said bottom counterbore and permitting said nut to be turned in said bore relative to said support plate and platform sheet for screwing the nut onto a said stud without disassembling the platform unit.

7. A unit according to claim 6 in which said support plate is a flat metal plate and said platform sheet is a plywood sheet, said fasteners being removable so that said plywood sheet can be replaced.

* * * * *